Patented Dec. 8, 1942

2,304,073

UNITED STATES PATENT OFFICE 2,304,073

METHOD OF MAKING ELECTROLYTIC DEVICES

Joseph B. Brennan, Euclid, Ohio

No Drawing. Application January 23, 1940, Serial No. 315,181

12 Claims. (Cl. 175—315)

This invention relates to methods of making electrolytic devices and particularly to the impregnation of electrodes of electrolytic devices with electrolyte or other material such as the active material of storage battery cells. In my prior Patents No. 2,104,018 and No. 2,104,019 and pending application, Serial No. 199,396, filed April 1, 1938, I have disclosed and claimed electrodes for electrolytic devices such as condensers, lightning arrestors, storage batteries and the like having a porous or permeable surface composed of finely divided cohering metallic particles. In such devices the interstices, pores, chinks, crevices or passages which give the surfaces their porous, permeable or reticulated character are extremely fine and the spray deposited particles making up the surface are very small. As a result such electrodes have a very extended surface area exposed to the action of the electrolyte or active material and by reason of the extended surface area the capacity and efficiency of such electrodes is greatly increased as compared to the capacity of prior types of electrodes.

Obviously, in order to take full advantage of the extended surface area of such electrodes the impregnating materials used in conjunction with such electrodes should penetrate substantially throughout the minute passageways and crevices between the finely divided cohering metallic particles. In conjunction with electrodes having their surfaces provided with electro-formed dielectric, oxide, or other films, the impregnating material should penetrate the electrode with substantial completeness not only in the completed electrolytic device, but also in the forming bath so that substantially the entire area of the porous surface of the electrodes will be properly filmed. In the case of an anode for an electrolytic condenser, for example, this is important not only to obtain the maximum capacity, but also to reduce the leakage to a minimum. The present invention relates particularly to a method whereby electrolytes or active materials and especially viscous or pasty materials can be caused to flow into such minute passageways, interstices or cracks so that substantially the entire surface area of such electrodes will come in contact with the electrolyte and the electrode may be substantially completely impregnated with electrolyte, even though the electrode may be of considerable thickness and may be made up of several porous layers.

According to a preferred form of my invention I cause the electrolyte or active material, as the case may be, to flow into the minute pores of electrodes having porous surfaces by subjecting the electrodes to vacuum to remove air or other gases therefrom, then applying the electrolyte or active material under pressure, and heating the electrodes to an extent sufficient to cause the minute particles of metal to expand thereby to open up the pores or interstices between the metallic particles and thus make it possible for the electrolyte or active material to penetrate more readily. In building up an electrode of several porous layers, such as disclosed in my Patent No. 2,037,848, issued April 21, 1936, each layer is impregnated, preferably as described above, before the overlying layer is deposited thereon. In the claims, and elsewhere in this specification, the term "impregnating material" is intended to include various types of materials such as the electrolytes used in electrolytic condensers or in the manufacture thereof, and the active materials used with batteries of various sorts.

A preferred manner of carrying out my method of impregnating electrolytic devices as applied particularly to condensers of the paste type may include the steps of placing the condenser in assembled or partly assembled condition in a chamber, evacuating the chamber to remove air therefrom, introducing electrolyte into the chamber, the electrolyte being maintained at an elevated temperature to thereby heat the porous surfaces of the electrodes of the electrolytic device and applying greater than atmospheric pressure to the electrolyte within the container. As an example, in a condenser embodying the electrolyte described and claimed in my Patent No. 2,095,966, and comprising a partially reacted condensation product of urea and formaldehyde, the electrolyte may be maintained under pressure of say two atmospheres and heated to a temperature of about 250° F., which temperature will be below the boiling point of the electrolyte under the greater than atmospheric pressure specified. Under such conditions the pores of the electrodes will be considerably expanded, particularly if the electrodes are composed of aluminum or other metal having a high coefficient of expansion.

Similarly, the plates of storage batteries embodying finely deposited porous spray deposited surfaces can be pasted or impregnated with active material, for example, plates of a storage battery made according to my pending application Serial No. 199,396 aforesaid can be pasted with a paste consisting of nickel hydrate in a solution of potassium hydroxide, the paste being of toothpaste consistency at ordinary room temperatures. By heating up the paste as well as the electrode as aforesaid, the viscosity of the paste is reduced and the pores of the electrode are caused to expand, thus making possible the thorough impregnation of such an electrode with a pasty or viscous electrolyte.

According to another mode of carrying out my invention, the electrodes or plates may be placed in a vacuum chamber as before and there preheated by, for example, electric radiant heaters disposed within the chamber. Thereafter the impregnating material, also preferably heated, is introduced into the evacuated chamber to cover all of the porous electrode areas and pressure preferably applied to the liquid as before, for example, by means of air pressure over the surface of the electrolyte.

In the case of a filmed electrode for a condenser the final formation current may be applied to the electrodes while they are still immersed in the electrolyte under pressure. Inasmuch as the final forming operation ordinarily generates additional heat resulting in an increase in pressure, it is preferable to employ cooling coils to assist in the control of the heat and pressure. If desired, the pressure may be reduced to atmospheric during the forming operation. In any event, the evacuation and heating of the electrode greatly facilitates the thorough penetration of the electrolyte into the minute interstices, crevices, cracks or pores of the electrode surface and thus insures the production of a film on substantially all of the surfaces of the porous electrode. Thus the maximum capacity of the electrode may be developed and leakage may be reduced to a minimum.

Obviously, the steps of subjecting the electrodes or plates to vacuum, heat and pressure may be employed in other film forming operations preceding the final film forming operation, or preceding the assembly of the electrodes or plates with other parts of the devices with advantageous results for my method, and particularly the penetration of the electrolyte and evacuation and heating of the electrodes or plates insures production of a film over substantially the entire area of the porous surfaces.

The present method is particularly advantageous in conjunction with the production of electrodes embodying a plurality of sprayed metallic layers, an electrode of this type adapted especially for condensers being described in my aforesaid prior Patent No. 2,037,848, issued April 21, 1936. In the production of such an electrode a layer of finely divided metallic particles may be sprayed upon a suitable base, then the layer may be impregnated with electrolyte, preferably as described herein, and another metallic layer may be sprayed upon the first impregnated layer. The operations of spraying and impregnating the sprayed surfaces may be carried out successively until the desired thickness of electrode material is obtained.

If the electrode is intended for use as an anode in a condenser the ordinary film forming operation is carried out between each of the successive spraying operations as described in my said Patent, No. 2,037,848. For other purposes such as for cathodes of condensers and for electrodes of other types of electrolytic devices the film forming operation may not be necessary. Preferably a pasty or viscous impregnating material, such as the urea-formaldehyde or nickel hydrate pastes mentioned above, is employed and the material may be permitted to dry partially before spraying another metallic layer thereon.

If desired, additional paste may be applied mechanically prior to the drying operation or the subsequent spraying of the metallic layer. In producing such a multiple layered electrode care must be taken to insure that every layer of sprayed metal is in the electrical circuit, whether by contact with the main electrical terminal or through some other conductor.

Various modifications and changes in the procedures outlined above may be made without departing from the spirit and scope of my invention. For example, the methods disclosed herein may be applied to the production of other types of electrolytic devices such as storage batteries embodying lead plates, lead oxide paste and an acid electrolyte. As noted above, I preferably employ vacuum and pressure and heat in the impregnation of electrodes or electrolytic devices according to my method. However, under some conditions satisfactory results may be obtained without utilizing all of the steps above outlined. It is therefore to be understood that my patent is not limited to the preferred forms of my invention set forth in detail herein or in any manner other than by the scope of the appended claims when given the range of equivalents to which my patent may be entitled.

I claim:

1. The method of making electrodes for electrolytic devices which includes the steps of making a porous spray-deposited conductive layer of metallic particles, impregnating said layer with electroylte by subjecting said layer to vacuum, heating said layer to enlarge the pores thereof and applying the electrolyte thereto under pressure, subjecting the impregnated layer to electrolysis to form a film on the surfaces of the particles making up the layer, partially drying the electrolyte, and spray-depositing another porous conductive layer upon said impregnated layer.

2. The method of making electrodes for electrolytic devices which includes the steps of making a porous spray-deposited conductive layer of metallic particles, impregnating said layer with a viscous or pasty material by heating said surface to enlarge the pores thereof and applying the material thereto, and spray-depositing another porous conductive layer upon said impregnated layer.

3. The method of making electrodes for electrolytic devices which includes the steps of making a porous spray-deposited conductive layer of metallic particles, impregnating said layer with a viscous or pasty material by subjecting said layer to vacuum and applying the material thereto, and spray-depositing another porous conductive layer upon said impregnated layer.

4. The method of making electrodes fc: electrolytic devices which includes the steps of making a porous spray-deposited conductive layer of metallic particles, impregnating said layer with a pasty or viscous material, partially drying the material, and spray-depositing another porous conductive layer upon said impregnated layer.

5. The method of making electrodes for electrolytic devices which includes the step of providing a porous spray-deposited conductive layer of finely divided metallic particles, impregnating said layer with an electrolyte, subjecting said layer to electrolysis to form a film on the surfaces of said particles, spray-depositing another conductive layer of finely divided metallic particles on the impregnated layer, impregnating said second layer with electrolyte and again subjecting the layers to electrolysis to form a film on the surfaces of the particles of said second layer.

6. The method of making electrodes for electrolytic devices which includes the step of providing a porous spray-deposited conductive layer of finely divided particles of aluminum, impregnating said layer with an electrolyte, subjecting said layer to electrolysis to form a dielectric film on the surfaces of said particles, spray-depositing another conductive layer of finely divided particles of aluminum on the impregnated layer, impregnating said second layer with electrolyte and again subjecting the layers to electrolysis to form a film on the surfaces of the particles of said second layer.

7. The method of making electrodes for electrolytic devices which includes the steps of providing a porous spray-deposited conductive layer of finely divided metallic particles, impregnating said layer with active material and spray-depositing another conductive layer of finely divided metallic particles on the impregnated layer.

8. The method of making electrodes for electrolytic condensers which includes the steps of providing a porous spray-deposited conductive layer of finely divided particles of film forming metal, impregnating said layer with an electrolyte, and spray-depositing another conductive layer of finely divided particles of film forming metal on the impregnated layer.

9. The method of making electrodes for electrolytic devices which includes the step of making a porous conductive layer of metallic particles, impregnating said layer with electrolyte by subjecting said layer to vacuum, heating said layer to enlarge the pores thereof and applying the electrolyte thereto under pressure, subjecting the impregnated layer to electrolysis to form a film on the surfaces of the particles making up the layer, partially drying the electrolyte, and depositing another porous conductive layer upon said impregnated layer.

10. The method of making electrodes for electrolytic devices which includes the steps of making a porous conductive layer of metallic particles, impregnating said layer with a pasty or viscous material, partially drying the material, and depositing another porous conductive layer upon said impregnated layer.

11. The method of making electrodes for electrolytic devices which includes the step of providing a porous conductive layer of finely divided metallic particles, impregnating said layer with an electrolyte, subjecting said layer to electrolysis to form a film on the surfaces of said particles, depositing another conductive layer of finely divided metallic particles on the impregnated layer, impregnating said second layer with electrolyte and again subjecting the layers to electrolysis to form a film on the surfaces of the particles of said second layer.

12. The method of making electrodes for electrolytic condensers which includes the steps of providing a porous conductive layer of finely divided particles of film forming metal, impregnating said layer with an electrolyte, and depositing another conductive layer of finely divided particles of film forming metal on the impregnated layer.

JOSEPH B. BRENNAN.